United States Patent [19]

Snyder et al.

[11] 4,123,503

[45] Oct. 31, 1978

[54] CATALYSIS OF PHOSPHAZENE CYCLICS TO POLYMER, USING LEWIS ACID COMPOUNDS

[75] Inventors: Dennis L. Snyder, Bolivar; Mark L. Stayer, Jr., Suffield; Jung W. Kang, Clinton, all of Ohio

[73] Assignee: The Firestone Tire & Rubber Company, Akron, Ohio

[21] Appl. No.: 771,221

[22] Filed: Mar. 23, 1977

Related U.S. Application Data

[63] Continuation-in-part of Ser. No. 606,802, Aug. 22, 1975, abandoned.

[51] Int. Cl.$^2$ ............................................. C01B 25/10
[52] U.S. Cl. ................................................... 423/300
[58] Field of Search .............................. 423/300, 301

[56] References Cited

U.S. PATENT DOCUMENTS

| | | | |
|---|---|---|---|
| 3,026,174 | 3/1962 | Paddock | 423/300 |
| 4,005,171 | 1/1977 | Reynard et al. | 423/300 |

*Primary Examiner*—O. R. Vertiz
*Assistant Examiner*—Gregory A. Heller

[57] ABSTRACT

Thermal polymerization of $(NPCl_2)_{3,4}$ is improved by conducting the polymerization in the presence of Lewis Acid type compounds of Al or B.

6 Claims, No Drawings

CATALYSIS OF PHOSPHAZENE CYCLICS TO POLYMER, USING LEWIS ACID COMPOUNDS

This application is a continuation-in-part of co-pending application Ser. No. 606,802, filed Aug. 22, 1975, now abandoned.

This invention relates to improvements in the conversion of low molecular weight cyclopolychlorophosphazenes to higher molecular weight linear polydichlorophosphazenes.

More particularly, it relates to the use of suitable catalysts in order to improve the above polymerization by increasing the rate of polymerization, while decreasing or entirely eliminating the formation of gel and by permitting better control of the molecular weight and other physical properties.

Thermal polymerizations of $(NPCl_2)_n$ where $n$ is a small integer such as 3 or 4 are described in Allcock et al, U.S. Pat. No. 3,370,020 issued Feb. 20, 1968 and in Rose, U.S. Pat. No. 3,515,688 issued June 2, 1970 and elsewhere in the literature.

In scaling-up these methods from laboratory size glass apparatus to pilot plant and semi-works installations, the polymerization vessels have heretofore been fabricated from stainless steels. Because of the relatively high temperatures utilized in the polymerization, the use of stainless steel reactor vessels rather than glass-lined vessels has been considered mandatory.

An undesired consequence of the use of stainless steel equipment has been the contamination of the polymerization mixture with small amounts of metals such as chromium, nickel and iron which have significant but unpredictable effects on the manner in which the polymerization proceeds. This effect is accentuated by higher temperatures owing to the corrosive nature of some of the materials present. It has been found that results of polymerizations in stainless steel reactors are different from results obtained in glass vessels and that gelation of the linear polydichlorophosphazenes becomes a serious and frequent problem in stainless steel equipment.

Consequently much effort has been directed toward effecting the polymerization at lower temperatures which might permit the use of glass-lined equipment, the use of which is generally considered safe at temperatures up to about 400° F.

It has now been found that the desired polymerization can be effected at lower temperatures and at a more rapid rate by use of Lewis Acid compounds as catalysts. It has also been found that the catalyzed polymerizations in glass or in stainless steel vessels proceed without the formation of gel, and that the molecular weight of the product can be controlled conveniently by varying the concentration of catalyst. It has further been found that some control over the molecular weight distribution of the resulting polymer can be achieved by incremental addition of the catalyst and/or of cyclic oligomers to the polymerization apparatus.

The following compounds are illustrative of the Lewis Acid catalysts which may be used in the practice of the present invention:

A. Organometallic compounds of metals of Group IIIA of the Periodic Table, represented by the formula $R_aMX_b$ in which M is a metal from Group IIIA, e.g. aluminum, having a valence of $a + b$; X is anionic, e.g. a halogen such as chlorine and R is a hydrocarbon selected from the group consisting of alkyl, aryl, cycloalkyl, alkaryl and arylalkyl.

B. Halogen compounds of non-metallic elements such as B, represented by the formula $AX_d$ wherein $d$ is the valence of the non-metal and X is a halogen such as F, Cl or Br. $BF_3$ is one such compound.

A particularly preferred group of Lewis Acid catalysts are compounds of aluminum such as:
triethyl aluminum or other aluminum alkyls
diethyl aluminum chloride
bis(diethylaluminum) oxide
diethyl aluminum ethoxide and other aluminum compounds of the general formula $Q_{an}Al_nZ_{bn}$ in which $n$ is either 1 or 2; $a$ and $b$ are integers from 0 to 3 and $a + b$ equals $3n$; and Q and Z are each selected from the group consisting of alkyl; halogen, particularly chlorine; alkoxy and hydride.

Even aluminum trichloride is found to have some catalytic activity in the polymerization, but its effectiveness appears to be closely related to its purity. Freshly purified $AlCl_3$ exhibits very little catalytic activity, but on standing or when impure it appears to increase in catalytic effect.

The invention will be more fully appreciated from the Examples which follow and which are intended to illustrate and not to limit the invention.

Cyclic trimer $(NPCl_2)_3$ and the indicated additive were charged into small, clean, dry, glass tubes in a dry box. The tubes were then subjected to a vacuum and sealed while connected to the vacuum line. The sealed tubes and their contents were maintained at the temperature and times indicated in Table I after which their contents were recovered by sublimations. The results are shown in Table I.

TABLE I

| | Aluminum Compounds | | | | | | |
|---|---|---|---|---|---|---|---|
| Additive | Amount/20 g Trimer | Hours | T °C | % Conv. | DSV | % Gel | % Conv/Hr. |
| Fresh $AlCl_3$ | 0.1 g | 20 | 240 | 17.2 | 2.34 | 0.0 | 0.86 |
| Aged $AlCl_3$ | 0.1 g | 4.0 | 243 | 63.5 | 1.36 | 0.0 | 15.9 |
| $Et_3Al_2Cl_3$ | 0.042 mM | 1.5 | 242 | 30.5 | 1.60 | 0.47 | 20.3 |
| $Et_3Al_2Cl_3$ | 0.028 mM | 1.5 | 245 | 41.2 | 2.18 | 0.56 | 27.5 |
| $Et_3Al_2Cl_3$ | 0.042 mM | 6.0 | 231 | 78.0 | 1.46 | 0.0 | 13.0 |
| None | 0 | 20 | 232 | 13.9 | 2.49 | 0.79 | 0.7 |
| None | 0 | 25 | 220 | 7.7 | 0.52 | 0.0 | 0.31 |
| $EtAlCl_2$ | 0.092 mM | 25 | 220 | 3.8 | 0.25 | 0.0 | 0.15 |
| $Et_2AlCl$ | 0.061 mM | 6.4 | 220 | 36.6 | 1.26 | 0.0 | 5.7 |
| $Et_3Al_2Cl_3$ | 0.098 mM | 7.9 | 220 | 25.9 | 1.28 | 0.0 | 3.3 |
| $Et_3Al$ | 0.089 mM | 6.4 | 220 | 37.4 | 1.17 | 0.0 | 5.8 |
| $Et_2AlOEt$ | 0.083 mM | 6.4 | 220 | 42.1 | 0.67 | 0.0 | 6.6 |
| $(i-Bu)_2AlH$ | 0.046 mM | 25 | 220 | 40.3 | 0.73 | 0.0 | 1.6 |

All require $C_5H_{11}OH$ to dissolve polymers.

In the following Example, trimer was charged into a Type 316 stainless steel reactor under an inert atmosphere and then the reactor was brought to reaction temperature (205° C.) over a period of approximately 1.5 hours. Then polymerization at 205° C. was conducted and samples were withdrawn at the times indicated. These samples were used to determine percent conversion, dilute solution viscosity (DSV), and percent gel. The final sample consisted of the remaining polymerizate in the reactor.

TABLE II

| Polymerization Time (Hrs.) | DSV | % Gel | % Conversion | Catalyst Used |
|---|---|---|---|---|
| 6.74 | 0.23 | 0.0 | 3.46 | None |
| 24.5 | 1.02 | 0.0 | 11.4 | None |
| 52.0 | 0.98 | 0.0 | 18.8 | None |
| 54.0 | 1.20 | 25.0* | 22.3 | None |

*or more. Gel tends to cling to agitator and is difficult to remove quantitatively.

The run was repeated with diethyl aluminum ethoxide catalyst, and the results are shown in Table III. In this polymerization, 0.15 mm of catalyst was used for every 100 gms. of trimer.

TABLE III

| Polymerization Time (Hrs.) | DSV | % Gel | % Conversion |
|---|---|---|---|
| 1.5 | 0.93 | 0.0 | 18.3 |
| 3.0 | 0.96 | 0.0 | 22.6 |
| 4.5 | 0.94 | 0.0 | 26.7 |
| 6.0 | 0.98 | 0.0 | 28.3 |
| 7.5 | 1.28 | 0.0 | 33.5 |

The product can be recovered in any of several ways. A preferred method is to permit the reactor to cool sufficiently whereupon the polydichlorophosphazene can be dissolved in a solvent or solvent mixture and the product can be flushed out of the reactor.

In the stainless steel reactor runs, the polymer was recovered as follows: the reactor was permitted to cool to 130° C. or lower and then a mixture of benzene and a polar material such as pentanol was added to the reactor. This preferred method described in an application filed by others under Ser. No. 606,804 of which we are aware, filed Aug. 22, 1975, concurrently with the present application comprises the addition of a mixture of pentanol and benzene to the reactor after it has been cooled to 130° C. or lower. Benzene alone will not effect dissolution of the polymer. Addition of pentanol (0.5-3.0% volume) to the benzene causes the polymer to dissolve completely. This polymer solution can now be conveniently handled in any transfer operations and can also be reacted with solutions of various nucleophiles (e.g. NaOR in THF). Other polar liquids can be used in place of pentanol.

A particular object of this invention is to conduct a catalyzed polymerization at temperatures well below 205° C. and preferably as low as 170° C. so that such polymerizations could be effected in glass-lined equipment instead of in stainless steel reaction vessels. Table IV presents results of polymerizations conducted at 170°-180° C.

TABLE IV

| Additive | HRS./° C | % Conversion | DSV | % Gel |
|---|---|---|---|---|
| None | 67.7/170-7 | 1.9 | — | — |
| Et$_3$Al | 65.8/180 | 37.6 | 1.29 | 0 |
| Et$_3$Al | 67.7/170-7 | 16.0 | 0.39 | 0 |
| Et$_2$AlOAlEt$_2$ | 49/170 | 23.0 | — | — |

A further object of the invention is to consistently conduct catalyzed polymerizations in stainless steel reactors without the formation of any substantial amounts of gel. Table V shows such results for four additional polymerizations. In the first three, the catalyst was diethyl aluminum ethoxide. In the fourth run there was no catalyst.

TABLE V

| I. Run 1050-66 (0.15 mm catalyst/100 g. trimer) | | | |
|---|---|---|---|
| Hrs. at 205° C | % Conversion | DSV | % Gel |
| 1.5 | 4.4 | 0.18 | 0.64 |
| 3.5 | 9.1 | 0.31 | 0.23 |
| 5.0 | 13.3 | 0.84 | 0.0 |
| 7.0 | 16.2 | 0.74 | 0.0 |
| 10.0 | 20.8 | 0.70 | 2.08 |
| 13.0 | 23.6 | 0.66 | 0.0 |
| 15.0 | 27.1 | 0.59 | 0.0 |
| 24.0 | 38.2 | — | — |
| II. Run 1050-71 (0.22 mm catalyst/100 g. trimer) | | | |
| Hrs. at 205° C | % Conversion | DSV | % Gel |
| 1.0 | 18.2 | 0.75 | 0.0 |
| 3.0 | 28.9 | 0.79 | 1.08 |
| 5.0 | 37.8 | 0.69 | 0.0 |
| 7.0 | 33.3 | — | — |
| 7.25 (total reactor) | 39.2 | 1.12 | 0.0 |
| III. Run 1050-75 (same as II) | | | |
| Hrs. at 205° C | % Conversion | DSV | % Gel |
| 3.0 | 31.0 | 0.85 | 0.0 |
| 20.5 | 65.1 | 0.8 | 0.0 |
| IV. Run 1050-74 (no catalyst) | | | |
| Hrs. at 205° C | % Conversion | DSV | % Gel |
| 6.75 | 3.5 | 0.23 | 0.0 |
| 24.5 | 11.4 | 1.02 | 0.0 |
| 52.0 | 18.8 | 0.98 | 0.0 |
| 54.0 | 22.0 | 1.20 | 24 |

The polymers from these catalyzed polymerizations are poly(dichlorophosphazenes) which are hydrolytically unstable. The poly(dichlorophosphazene) can be converted to useful derivatives by a post polymerization reaction with metal alkoxides, see Allcock U.S. Pat. No. 3,370,020 and Rose U.S. Pat. No. 3,515,688. Such useful derivatives can be prepared from the presently prepared poly(dichlorophosphazenes).

The properties of the derivatives thereof are shown in Table VI.

TABLE VI

| | *C$_2^f$,C$_5^f$, OAP DERIVATIVES FROM CATALYZED POLYMERIZATIONS | | | |
|---|---|---|---|---|
| Run No. | 1050-44-1 | 1050-37-2 | 1050-68[1] | 1050-75[2] |
| Additive | Et$_3$Al$_2$Cl$_3$ | Et$_3$Al$_2$Cl$_3$ | Et$_2$AlOEt | Et$_2$AlOEt |
| (NPCl$_2$)$_n$ DSV | 0.90 | 1.10 | 1.28 | 0.8 |
| (NPCl$_2$)$_n$ % Gel | 0.0 | 0.0 | 0.0 | 0.0 |
| Derivative Analyses | | | | |
| DSV | 1.37 | 1.35 | 1.26 | 1.55 |
| % Gel | 0.0 | 0.0 | 0.0 | 0.0 |
| % Na | 0.26 | 0.073 | 0.150 | 0.22 |
| % Cl | 0.65 | 0.082 | 0.158 | 0.24 |

[1]Alkoxide added rapidly to (NPCl$_2$)$_n$ at low temperature.
[2]Alkoxide added slowly to (NPCl$_2$)$_n$ at room temperature.
*C$_2^f$ = OCH$_2$CF$_3$
C$_5^f$ = OCH$_2$(CF$_2$)$_3$CF$_2$H

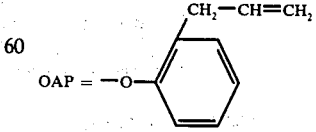

$$OAP = -O-\underset{}{\bigcirc}-CH_2-CH=CH_2$$

As indicated previously other Lewis Acid compounds may be used in place of the aluminum compounds of the previous examples as may be seen from Table VII which follows:

Table VII
Effect of Various Additives on Hexachlorocyclotriphosphazene Polymerizations

| Polymerization No. | Additive | T° C | Hrs. | % Conv. | DSV | % Gel |
|---|---|---|---|---|---|---|
| 1 | $BBr_3$ | 218–222 | 47.7 | 48.0 | 0.19 | 0.0 |
| 2 | $Bu_3B$ | 218–222 | 22.7 | 14.4 | 0.05 | 0.0 |
| 3 | None | 220 | 47.7 | 13.3 | 1.78 | 0.0 |

The amount of catalyst used depends to some extent on the specific catalyst selected and on the desired product. For the preparation of low molecular weight polymer up to 10 millimole/100 grams of trimer may be useful. A suitable working range for the preparation of useful elastomeric polydichlorophosphazene material is from 0.1 to about 0.5 millimoles/100 grams of trimer, with about 0.22 millimoles/100 grams of trimer preferred. Further, mixtures of catalysts may be used instead of individual catalysts with similar results. Instead of the cyclic trimer starting materials used in the preceding examples, cyclic tetramer, mixtures of cyclic trimer and tetramer and other cyclic oligomers up to cyclic heptamer and mixtures of such oligomers may be polymerized to essentially linear polydichlorophosphazene polymer of molecular number 10 to about 50,000.

The catalyzed polymerization of cyclic polydichlorophosphazene trimer and tetramer is reported in several recent publications including the following which are believed to represent the state of the art:

J. Pol. Sci. 36, 195 (1959)
J. Pol. Sci. 36, 383 (1960)
J. Pol. Sci. Pt. B 7 743 (1969)
Kogyo Kagaku Zasshi 66, 621 (1963)
Nature 195, 491 (1962)
Angew Chem. 65, 173 (1953)
J. Pol. Sci. C (16), 3639
J. Pol. Sci. 5 Pt. A-1 3061 (1967)

None of the above describes the use of Lewis Acid compounds of aluminum as catalysts for the thermal polymerization of $(NPCl_2)_3$.

Having now described preferred embodiments of the invention, it is not intended that it be limited except as may be required by the appended claims.

We claim:

1. A process for polymerizing cyclic $(NPCl_2)_n$ in which $n$ is an integer smaller than 7 which comprises heating said polydichlorophosphazene in the presence of an effective amount of a catalyst comprising a Lewis Acid compound selected from the group consisting of (1) organo metallic compounds of a Group IIIA metal represented by the general formula $R_aMX_b$ in which M is a metal of Group IIIA having a valence of $a+b$, X is anionic, R is a monovalent hydrocarbon radical selected from the group consisting of alkyl, aryl, cycloalkyl, alkaryl and arylalkyl, and $a$ is an integer from 1 to 3 and $b$ is an integer from 0 to 3 and (2) boron halides represented by the formula $BX_3$ wherein X is selected from the group consisting of F, Cl and Br and at temperatures up to about 290° C. to produce a substantially linear $(NPCl_2)_m$ polymer in which $m$ is between about 10 and about 50,000.

2. The process of claim 1 in which the catalyst is an Al compound represented by the formula $R_{an}Al_nZ_{bn}$ in which $n$ is either 1 or 2, $a + b$ equals, $3n$, Z is selected from the group consisting of alkyl, halogen, alkoxy and hydride and R, $a$ and $b$ are as defined in claim 1.

3. The process of claim 1 wherein the amount of catalyst present is up to 10 m moles/100 g of $(NPCl_2)_n$.

4. The process of claim 1 wherein $n$ is an integer selected from the group consisting of 3,4 and mixtures of 3 and 4.

5. The process of claim 1 wherein the temperature is about 170° C.

6. The process of claim 3 wherein the amount of catalyst is about 0.1 to 0.5 m moles/100 g of $(NPCl_2)_n$.

* * * * *